(12) United States Patent
Nishito et al.

(10) Patent No.: US 10,240,499 B2
(45) Date of Patent: Mar. 26, 2019

(54) EXHAUST PURIFICATION SYSTEM AND CONTROL METHOD OF THE SAME

(71) Applicant: ISUZU MOTORS LIMITED, Tokyo (JP)

(72) Inventors: Masaaki Nishito, Fujisawa (JP); Teruo Nakada, Fujisawa (JP); Takayuki Sakamoto, Fujisawa (JP); Daiji Nagaoka, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 134 days.

(21) Appl. No.: 15/510,669

(22) PCT Filed: Sep. 11, 2015

(86) PCT No.: PCT/JP2015/075877
§ 371 (c)(1),
(2) Date: Mar. 10, 2017

(87) PCT Pub. No.: WO2016/039453
PCT Pub. Date: Mar. 17, 2016

(65) Prior Publication Data
US 2017/0218807 A1    Aug. 3, 2017

(30) Foreign Application Priority Data
Sep. 12, 2014   (JP) ................. 2014-186760

(51) Int. Cl.
*F01N 3/023*    (2006.01)
*F01N 3/02*    (2006.01)
(Continued)

(52) U.S. Cl.
CPC ............ *F01N 3/023* (2013.01); *B01D 53/94* (2013.01); *F01N 3/02* (2013.01); *F01N 3/20* (2013.01);
(Continued)

(58) Field of Classification Search
CPC .......... F01N 3/02; F01N 3/023; F01N 3/0814; F01N 3/0842; F01N 3/0871;
(Continued)

(56) References Cited

U.S. PATENT DOCUMENTS

| | | |
|---|---|---|
| 2003/0110760 A1 | 6/2003 | Shirakawa |
| 2009/0049824 A1 | 2/2009 | Kojima et al. |
| 2010/0307132 A1 | 12/2010 | Yuza et al. |

FOREIGN PATENT DOCUMENTS

| | | |
|---|---|---|
| DE | 102004026823 A1 | 1/2005 |
| EP | 1538311 A1 | 6/2005 |

(Continued)

OTHER PUBLICATIONS

Extended European Search Report for related EP Application No. 15840686.8, dated Jun. 14, 2018; 6 pages.
(Continued)

*Primary Examiner* — Audrey K Bradley
(74) *Attorney, Agent, or Firm* — Procopio, Cory, Hargreaves & Savitch LLP

(57) ABSTRACT

An exhaust purification system includes: an NOx reduction type catalyst, which is provided in an exhaust system; and a regeneration treatment unit, which recovers an NOx purification capacity of the NOx reduction type catalyst, wherein the regeneration treatment unit includes: a target setting unit, which sets a target injection amount of at least one of a post injection and an exhaust pipe injection that is required for setting an excess-air-ratio of the exhaust gas to the target excess-air-ratio, based on a suction air amount of the internal combustion engine, the target excess-air-ratio, and a fuel injection amount of the internal combustion engine; and an injection controller, which controls an injection amount of at
(Continued)

least one of the post injection and the exhaust pipe injection, based on the target injection amount input from the target setting unit.

5 Claims, 11 Drawing Sheets

(51) Int. Cl.
*F01N 3/20* (2006.01)
*F01N 3/36* (2006.01)
*F02D 41/02* (2006.01)
*F02D 41/14* (2006.01)
*F02D 41/18* (2006.01)
*F02D 41/40* (2006.01)
*B01D 53/94* (2006.01)
*F01N 3/24* (2006.01)

(52) U.S. Cl.
CPC .............. *F01N 3/24* (2013.01); *F01N 3/36* (2013.01); *F02D 41/025* (2013.01); *F02D 41/0275* (2013.01); *F02D 41/1454* (2013.01); *F02D 41/1458* (2013.01); *F02D 41/1475* (2013.01); *F02D 41/182* (2013.01); *F02D 41/405* (2013.01); *F02D 41/401* (2013.01); *F02D 41/402* (2013.01); *Y02T 10/47* (2013.01)

(58) Field of Classification Search
CPC . F01N 3/0885; F01N 3/20; F01N 3/24; F01N 3/2033; F01N 3/2066; F01N 3/36; F01N 11/007; F01N 2560/025; F01N 2560/06; F01N 2610/03; F01N 2900/0408; F01N 2900/08; F01N 2900/1402; F01N 2900/1404; F01N 2900/1602; F01N 2900/1612; F01N 2900/1614; F02D 41/04; F02D 41/14; F02D 41/32; F02D 41/34; F02D 45/00; B01D 53/94; Y02T 10/47

See application file for complete search history.

(56) References Cited

FOREIGN PATENT DOCUMENTS

| | | | |
|---|---|---|---|
| EP | 1793099 A1 | | 6/2007 |
| JP | 04252833 A | * | 9/1992 |
| JP | 2003-090250 A | | 3/2003 |
| JP | 2003-161145 A | | 6/2003 |
| JP | 2004-218518 A | | 8/2004 |
| JP | 2008-202425 A | | 9/2008 |
| JP | 2009-047086 A | | 3/2009 |
| JP | 2009-203866 A | | 9/2009 |
| JP | 2010-007634 A | | 1/2010 |

OTHER PUBLICATIONS

International Search Report and Written Opinion for PCT App No. PCT/JP2015/075877 dated Dec. 1, 2015, 7 pgs.

* cited by examiner

EXHAUST PURIFICATION SYSTEM AND CONTROL METHOD OF THE SAME

CROSS-REFERENCE TO RELATED APPLICATIONS

This application is a U.S. National Stage entry of PCT Application No. PCT/JP2015/075877, filed on Sep. 11, 2015, which claims priority to Japanese Patent Application No. 2014-186760, filed Sep. 12, 2014, the contents of which are incorporated herein by reference.

TECHNICAL FIELD

The present invention relates to an exhaust purification system and a control method of the same.

BACKGROUND ART

In the background art, an NOx occlusion reduction type catalyst is known as a catalyst which reduces and purifies a nitrogen compound (NOx) in an exhaust gas discharged from an internal combustion engine. When the exhaust was is under a lean atmosphere, the NOx occlusion reduction type catalyst occludes the NOx contained in the exhaust gas. When the exhaust gas is under a rich atmosphere, the NOx occlusion reduction type catalyst detoxifies the occluded NOx through reducing and purifying by hydrocarbon contained in the exhaust gas, and discharges the NOx. For this reason, in a case where the NOx occlusion amount of the catalyst reaches a predetermined amount, in order to recover NOx occlusion capacity, it is necessary to regularly perform the so-called NOx purge which makes the exhaust gas be in a rich state by a post injection or an exhaust pipe injection (for example, see Patent Literature 1).

In the NOx occlusion reduction type catalyst, a sulfur oxide contained in the exhaust was (hereinafter, referred to as SOx) is also occluded. There is a problem that when the SOx occlusion amount increases, the NOx purification capacity of the NOx occlusion reduction type catalyst is reduced. For this reason, in a case where an SOx occlusion amount reaches a predetermined amount in order that the SOx is desorbed from the NOx occlusion reduction type catalyst to recover the NOx occlusion reduction type catalyst from S-poisoning, it is necessary to regularly perform the so-called SOx purge in which an unburned fuel is supplied to an upstream-side oxidation catalyst by the post injection or the exhaust pipe injection to raise an exhaust temperature to an SOx desorption temperature (for example, see Patent Literature 2).

CITATION LIST

Patent Literature

[Patent Literature 1]: Japanese Unexamined Patent Application Publication No. 2008-202425
[Patent Literature 2]: Japanese Unexamined Patent Application Publication No. 2009-47086
[Patent Literature 3]: Japanese Unexamined Patent Application Publication No. 2009-203866
[Patent Literature 4]: Japanese Unexamined Patent Application Publication No. 2003-090250

SUMMARY OF INVENTION

Technical Problem

Generally, when the NOx purge or the SOx purge is executed, in order to lower the exhaust gas to a target excess-air-ratio required for the purge, the post injection amount, the exhaust pipe injection amount, or the like is feedback-controlled based on a sensor value of a lambda sensor disposed on the upstream side of the NOx occlusion reduction type catalyst.

However, there is a problem that in a state, where the fuel supplied by the post injection or the exhaust pipe injection is not sufficiently oxidized due to exhaust heat, the lambda sensor cannot secure measurement accuracy. For this reason, in a method of using the lambda sensor, the exhaust gas may not be controlled to the target excess-air-ratio.

The disclosed system is made to effectively control an exhaust gas to a target excess-air-ratio of an NOx purge or an SOx purge without using a lambda value of the exhaust gas.

Solution to Problem

The disclosed system is an exhaust purification system including: an NOx reduction type catalyst, which is provided in an exhaust system of an internal combustion engine and reduces and purifies NOx in an exhaust gas; and a regeneration treatment unit, which recovers an NOx purification capacity of the NOx reduction type catalyst by lowering an excess-air-ratio of the exhaust gas to a predetermined target excess-air-ratio, wherein the regeneration treatment unit includes a target setting unit which sets a target injection amount of at least one of a post injection and an exhaust pipe injection that is required for setting an excess-air-ratio of the exhaust gas to the target excess-air-ratio, based on a suction air amount of the internal combustion engine, the target excess-air-ratio, and a fuel injection amount of the internal combustion engine, and an injection controller, which controls an injection amount of at least one of the post injection and the exhaust pipe injection, based on the target injection amount input from the target setting unit.

DESCRIPTION OF EMBODIMENTS

Hereinafter, an exhaust purification system according to one embodiment of the present invention will be described based on accompanying drawings.

Figure 1:
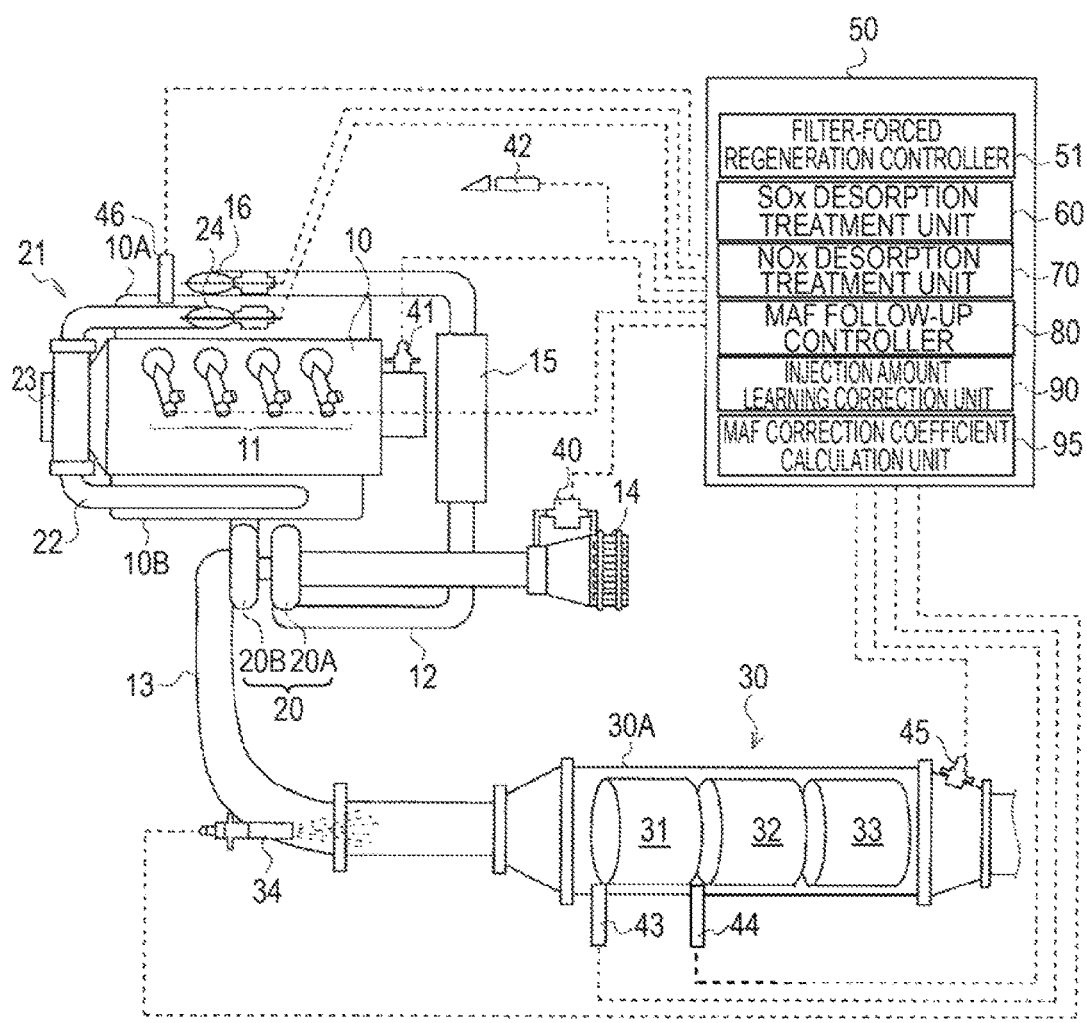
FIG. 1 is an entire configuration diagram illustrating an exhaust purification system according to this embodiment.

As illustrated in FIG. 1, an injector 11 which directly injects high pressure fuel accumulated in a common rail (not illustrated) into a cylinder is provided in each of cylinders of a diesel engine (hereinafter, simply referred to as an engine) 10. The fuel injection amount or the fuel injection timing of the injector 11 is controlled in response to an instruction signal input from an electronic controller (hereinafter, referred to as ECU) 50.

An intake manifold 10A of the engine 10 is connected with an intake passage 12 which introduces fresh air therein, and an exhaust manifold 10B is connected with an exhaust passage 13 which derives an exhaust gas outside. An air cleaner 14, an intake air amount sensor (hereinafter, referred to as a MAF sensor) 40, a compressor 20A of a variable capacity supercharger 20, an intercooler 15, an intake throttle valve 16, and the like are provided in order from an intake upstream side in the intake passage 12. A turbine 20B of the variable capacity supercharger 20, an exhaust post-treatment device 30, and the like are provided in order from an exhaust upstream side in the exhaust passage 13. In FIG. 1, a reference numeral 41 denotes an engine speed sensor, a reference numeral 42 denotes an accelerator opening sensor, and a reference numeral 46 denotes a boost pressure sensor.

An EGR device 21 includes an EGR passage 22 which connects the exhaust manifold 10B and the intake manifold 10A, an EGR cooler 23 which cools an EGR gas, and an FOR valve 24 which adjusts an EGR amount.

The exhaust post-treatment device 30 is configured such that an oxidation catalyst 31, an NOx occlusion reduction type catalyst 32, and a particulate filter (hereinafter, simply referred to as a filter) 33 are disposed in order from the exhaust upstream side in a case 30A. An exhaust pipe injection device 34 which injects an unburned fuel (mainly, HC) into the exhaust passage 13 in response to the instruction signal input from an ECU 50 is provided in the exhaust passage 13 on the upstream side from the oxidation catalyst 31.

For example, the oxidation catalyst 31 is formed by carrying an oxidation catalyst component on a ceramic carrier surface such as a honeycomb structure. When an unburned fuel is supplied by the post injection of the exhaust pipe injection device 34 or the injector 11, the oxidation catalyst 31 oxidizes the unburned fuel to raise the exhaust temperature.

For example, the NOx occlusion reduction type catalyst 32 is formed by carrying an alkali metal and the like on a ceramic carrier surface such as a honeycomb structure. The NOx occlusion reduction type catalyst 32 occludes NOx in the exhaust gas when an exhaust air fuel ratio is in a lean state, and reduces and purifies the occluded NOx by a reducing agent (HC and the like) contained in the exhaust gas when the exhaust air fuel ratio is in a rich state.

For example, the filter 33 is formed such that a plurality of cells sectioned by porous partition walls are disposed in a flowing direction of the exhaust gas, and the upstream side and the downstream side of the cells are sealed alternately. In the filter 33, PM in the exhaust gas is collected m a pore or a surface of the partition wall, and when the estimation amount of PM deposition reaches a predetermined amount, the so-called filter-forced regeneration is performed which combusts and removes the PM. The filter-forced regeneration is performed in such a manner that the unburned fuel is supplied to the oxidation catalyst 31 on the upstream side by an exhaust pipe injection or the post injection, and the temperature of the exhaust gas flowing in the filter 33 is raised to a PM combusting temperature, A first exhaust temperature sensor 43 is provided on the upstream side from the oxidation catalyst 31, and detects the temperature of the exhaust gas flowing in the oxidation catalyst 31. A second exhaust temperature sensor 44 is provided between the oxidation catalyst 31 and the NOx occlusion reduction type catalyst 32, and detects the temperature of the exhaust gas flow mg in the NOx occlusion reduction type catalyst 32. An NOx/lambda sensor 45 is provided on the downstream side from the filter 33, and detects an NOx value and a lambda value of the exhaust gas passing through the NOx occlusion reduction type catalyst 32 (hereinafter, referred to as an excess-air-ratio).

The ECU 50 performs various controls on, the engine 10 and the like, and includes a well-known CPU or a ROM, a RAM, an input port, an output port, and the like. In order to perform the various controls, the sensor values of the sensors 40 to 45 are input to the ECU 50. The ECU 50 includes a filter-forced regeneration controller 51, an SOx desorption treatment unit 60, an NOx desorption treatment unit 70, a MAF follow-up controller 80, an injection amount learning correction unit 90, and a MAF correction coefficient calculation unit 95 as partial functional elements. In description, such functional elements are included in the ECU 50 which is an integral hardware. However, any part thereof may be provided in a separate hardware.

<Filter-Forced Regeneration Control>

Figure 2:
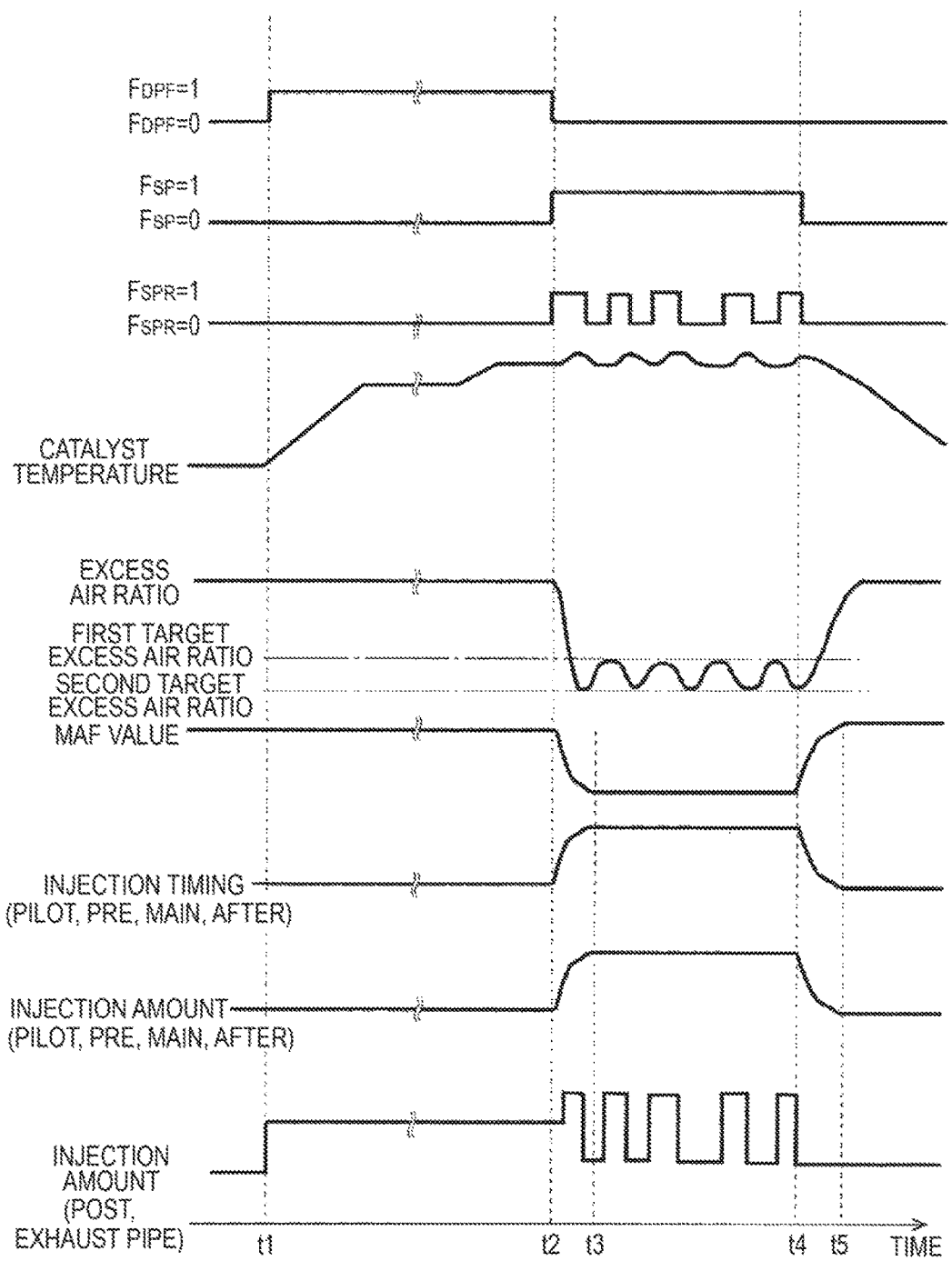
FIG. 2 is a timing chart for describing an SOx purge control according to this embodiment.

The filter-forced regeneration controller 51 estimates the PM deposition amount of the filter 33 from the travel distance of the vehicle, or the differential pressure across the filter detected by a differential pressure sensor (not illustrated), and turns on a forced regeneration flag $F_{DPF}$ when the estimation amount of PM deposition exceeds a predetermined upper limit threshold (see time $t_1$ of FIG. 2). When the forced regeneration flag $F_{DPF}$ is turned on, the instruction signal which executes the exhaust pipe injection is transmitted to the exhaust pipe injection device 34, or the instruction signal which executes the post injection is transmitted to each of the injectors 11, so that the exhaust temperature is raised to the PM combusting temperature (for example, about 550° C.). The forced regeneration flag $F_{DPF}$ is turned off when the estimation amount of PM deposition is reduced to a predetermined lower limit threshold (determination threshold) indicating combusting and removing (see time $t_2$ of FIG. 2). For example, the determination threshold in which the forced regeneration flag $F_{DPF}$ is turned off may be set based on the upper limit, elapsed time or the upper limit cumulative injection amount from the start ($F_{DPF}$=1) of the filter-forced regeneration.

<SOx Purge Control>

The SOx desorption treatment unit 60 is an example of a regeneration treatment unit of the present invention, and executes a control (hereinafter, referred to the control as an SOx purge control) which recovers the NOx occlusion reduction type catalyst 32 from SOx-poisoning by setting the exhaust gas to a rich state so as to raise the exhaust temperature to a sulfur desorption temperature (for example, about 600° C.).

FIG. 2 illustrates a timing flowchart of the SOx purge control of this embodiment. As illustrated in FIG. 2, the SOx purge flag $F_{SP}$ which starts the SOx purge control is turned on simultaneously when the forced regeneration flag $F_{DPF}$ is turned off (see time $t_2$ of FIG. 2). Accordingly, a transition to the SOx purge control can be efficiently performed from a state where the exhaust temperature is raised by the forced regeneration of the filter 33, and the fuel consumption amount can be reduced effectively.

In this embodiment, the enrichment of the exhaust gas is made by using the SOx purge control, for example, in a such a manner that the SOx purge lean control that lowers the excess-air-ratio by an air-system control from a steady operating state (for example, about 1.5) to a first target excess-air-ratio (for example, about 1.3) on a lean side from a value equivalent to a theoretical air-fuel ratio (about 1.0), and the SOx purge rich control that lowers the excess-air-ratio by the injection control from the first target excess-air-ratio to a second target excess-air-ratio on a rich side (for example, about 0.9) are used in combination. Hereinafter, a detail description will be given about the SOx purge lean control and the SOx purge rich control.

<Air-System Control of SOx Purge Lean Control>

Figure 3:
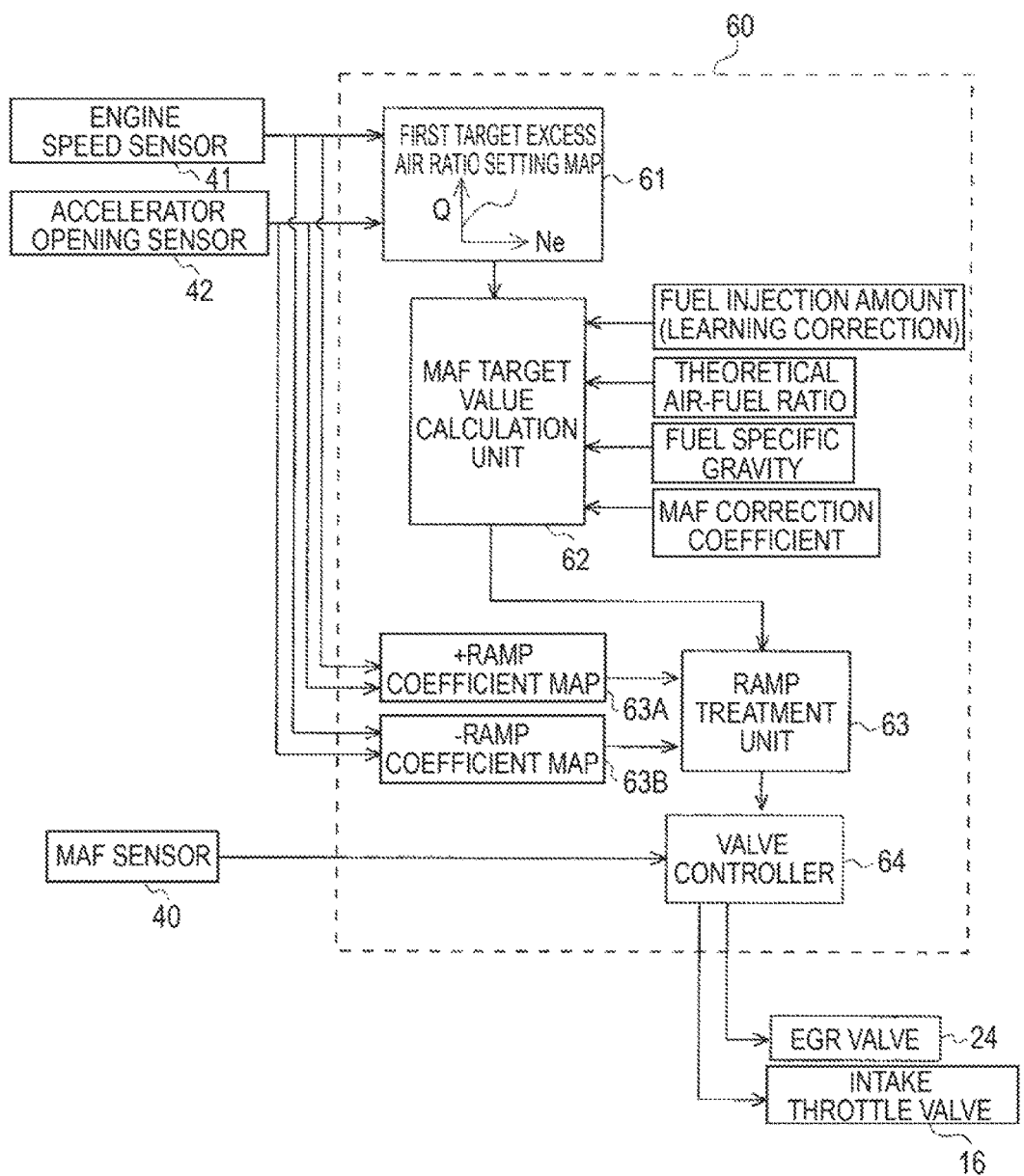
FIG. 3 is a block diagram illustrating a setting process of a MAF target value at the time of an SOx purge lean control according to this embodiment.

FIG. 3 is a block diagram illustrating a setting process of a MAF target value $MAF_{SPL\ Trgt}$ at the time of the SOx purge lean control. A first target excess-air-ratio setting map 61 is a map based on an engine speed Ne and an accelerator opening degree Q (fuel injection amount of the engine 10). An excess-air-ratio target value $\lambda_{SPL\ Trgt}$ (first target excess-air-ratio) at the time of the SOx purge lean control corresponding to the engine speed Ne and the accelerator opening degree Q is set based on an experiment and the like, in advance.

First, the excess-air-ratio target value $\lambda_{SPL\ Trgt}$ at the time of the SOx purge lean control is read from the first target excess-air-ratio setting map 61 by using the engine speed Ne and the accelerator opening degree Q as input signals, and is input to a MAF target value calculation unit 62. In addition, in the MAF target value calculation unit 62, the MAF target value $MAF_{SPL\ Trgt}$ at the time of the SOx purge lean control is calculated based on the following Equation (1).

$$MAF_{SPL\ Trgt} = \lambda_{SPL\ Trgt} \times Q_{fnl\ corrd} \times Ro_{Fuel} \times AFR_{sto} / Maf_{corr} \quad (1)$$

In Equation (1), $Q_{fnl\ corrd}$ indicates a learning-corrected (to be described later) fuel injection amount (excluding the post injection), $Ro_{Fuel}$ indicates a fuel specific gravity, $AFR_{sto}$ indicates a theoretical air-fuel ratio, and $Maf_{coor}$ indicates a MAF correction coefficient (to be described later).

The MAF target value $MAF_{SPL\ Trgt}$ calculated by the MAF target value calculation unit 62 is input to a ramp treatment unit 63 when the SOx purge flag $F_{SP}$ is turned on (see time $t_2$ of FIG. 2). The ramp treatment unit 63 reads a ramp coefficient from ramp coefficient maps 63A and 63B by using the engine speed Ne and the accelerator opening degree Q as input signals, and inputs a MAF target ramp value $MAF_{SPL\ Trgt\ Ramp}$, in which the ramp coefficient is added, to a valve controller 64.

The valve controller 64 executes a feedback control that throttles the intake throttle valve 16 to the shutting side and opens the EGR valve 24 to the open side such that an actual MAF value $MAF_{Act}$ input from the MAF sensor 40 becomes the MAF target ramp value $MAF_{SPL\ Trgt\ Ramp}$.

In this manner, in this embodiment, the MAF target value $MAF_{SPL\ Trgt}$ is set based on the excess-air-ratio target value $\lambda_{SPL\ Trgt}$ read from the first target excess-air-ratio setting map 61 and the fuel injection amount of the injector 11, and an air system operation is feedback-controlled based on the MAF target value $MAF_{SPL\ Trgt}$. Accordingly, without providing the lambda sensor on the upstream side of the NOx occlusion reduction type catalyst 32 or without using a sensor value of the lambda sensor even when the lambda sensor is provided on the upstream side of the NOx occlusion reduction type catalyst 32, the exhaust gas can be effectively lowered to the desired excess-air-ratio required for the SOx purge lean control.

When the fuel injection amount $Q_{fnl\ corrd}$ after the learning correction is used as the fuel injection amount of the injector 11, the MAF target value $MAF_{SPL\ Trgt}$ can be set by a feed-forward control to effectively exclude influence such as the aged deterioration, the property change, or the individual difference of the injector 11.

When the ramp coefficient set in response to the operating state of the engine 10 is added to the MAF target value $MAF_{SPL\ Trgt}$, the deterioration of the drivability and the like caused by the misfire or the torque fluctuation of the engine 10 due to the rapid change of an intake air amount can be effectively suppressed.

<Fuel Injection Amount Setting of SOx Purge Rich Control>

Figure 4:
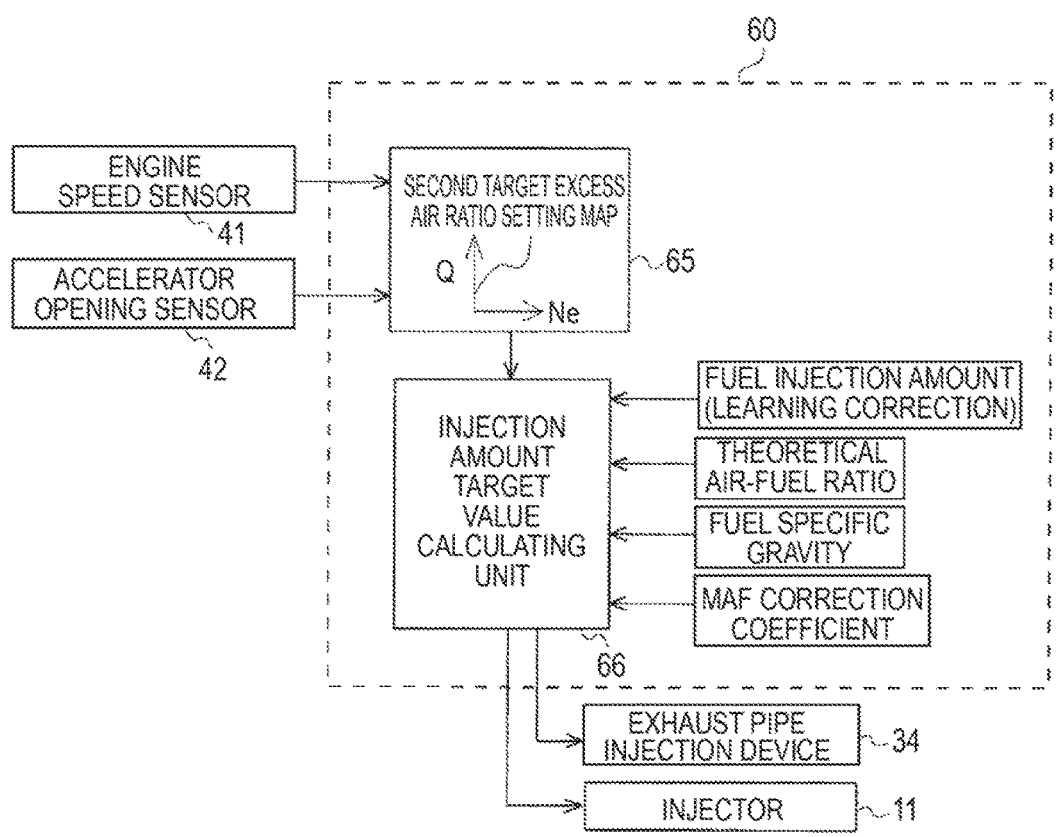
FIG. 4 is a block diagram illustrating a setting process of a target injection amount at the time of an SOx purge rich control according to this embodiment.

FIG. 4 is a block diagram illustrating a setting process of the target injection amount $Q_{SPR\ Trgt}$ (injection amount per unit of time) of the exhaust pipe injection or the post injection in the SOx purge rich control. A second target excess-air-ratio setting map 65 is a map based on the engine speed Ne and the accelerator opening degree Q. The excess-air-ratio target value $\lambda_{SPR\ Trgt}$ (second target excess-air-ratio) at the, time of the SOx purge rich control corresponding to the engine speed Ne and the accelerator opening degree Q is set based on an experiment and the like, in advance.

First, the excess-air-ratio target value $\lambda_{SPR\ Trgt}$ at the time of the SOx purge rich control is read from the second target excess-air-ratio setting map 65 by using the engine speed Ne and the accelerator opening degree as input signals, and is input to an injection amount target value calculating unit 66. In addition, in the injection amount target value calculating unit 66, the target injection amount $Q_{SPR\ Trgt}$ at the time of the SOx purge rich control is calculated based on the following Equation (2).

$$Q_{SPR\ Trgt} = MAF_{SPR\ Trgt} \times Maf_{corr} / (\lambda_{SPR\ Trgt} \times Ro_{fuel} \times AFR_{sto}) - Q_{fnl\ corrd} \quad (2)$$

In Equation (2), $MAF_{SPR\ Trgt}$ is a MAF target value at the time of a lean SOx purge, and is input from the above-described MAF target value calculation unit 62. $Q_{fnlRaw\ corrd}$ indicates a learning-corrected (to be described later) fuel injection amount (excluding the post injection) before a MAF follow-up control is applied thereto, $Ro_{Fuel}$ indicates a fuel specific gravity, and $AFR_{sto}$ indicates a theoretical air-fuel ratio, and $Maf_{corr}$ indicates a MAF correction coefficient (to be described later).

When the SOx purge rich flag $F_{SPR}$ (to be described later) is turned on, the target injection amount $Q_{SPR\ Trgt}$ calculated by the injection amount target value calculating unit 66 is transmitted as the injection instruction signal to the exhaust pipe injection device 34 or the injector 11.

In this manner, in this embodiment, the target injection amount $Q_{SPR\ Trgt}$ is set based on the excess-air-ratio target value $\lambda_{SPR\ Trgt}$ read from the second target excess-air-ratio setting map 65 and the fuel injection amount of the injector 11. Accordingly, without providing the lambda sensor on the upstream side of the NOx occlusion reduction type catalyst 32 or without using a sensor value of the lambda sensor even when the lambda sensor is provided on the upstream side of the NOx occlusion reduction type catalyst 32, the exhaust gas can be effectively lowered to the desired excess-air-ratio required for the SOx purge rich control.

When the fuel injection amount $Q_{fnl\ corrd}$ after the learning correction is used as the fuel injection amount of the injector 11, the target injection amount $Q_{SPR\ Trgt}$ can be set by the feed-forward control to effectively exclude influence such as the aged deterioration, the property change, or the like of the injector 11.

<Catalyst Temperature Adjustment Control of SOx Purge Control>

As illustrated in times $t_2$ to $t_4$ of FIG. 2, the temperature of the exhaust gas (hereinafter, referred to as a catalyst temperature) flowing in the NOx occlusion reduction type catalyst 32 during the SOx purge control is controlled by alternately switching on and off (rich and lean) of the SOx purge rich flag $F_{SPR}$ which executes the exhaust pipe injection or the post injection. When the SOx purge rich flag $F_{SPR}$ is turned on ($F_{SPR} = 1$), the catalyst temperature is raised by the exhaust pipe injection or the post injection (hereinafter, referred to a time thereof as an injection time $T_{F\ INT}$). On the other hand, when the SOx puree rich flag $F_{SPR}$ is turned off, the catalyst temperature is lowered by the stop of the exhaust pipe injection or the post injection (hereinafter, referred to a time thereof as an interval $T_{F\ INT}$).

In this embodiment, the injection time $T_{F\ INJ}$ is set by reading a value corresponding to the engine speed Ne and the accelerator opening degree Q from an injection time setting map (not illustrated) created through an experiment and the like, in advance. In the injection time setting map, the injection time required to reliably lower the excess-air-ratio of the exhaust gas obtained by an experiment and the like, in advance to the second target excess-air-ratio is set in response to the operating state of the engine 10.

When the SOx purge rich flag $F_{SPR}$ in which the catalyst temperature is the highest is switched from the On state to the Off state, the interval $T_{F\ INT}$ is set through a feedback control. Specifically, the interval $T_{F\ INT}$ is processed by a PID control configured by a proportional control that changes an input signal in proportion to the deviation $\Delta T$ between a target catalyst, temperature and an estimated catalyst temperature when the SOx purge rich flag $F_{SPR}$ is turned off, an integral control that changes the input signal in proportion to a time integral value of the deviation $\Delta T$, and a differential control that changes the input signal in proportion to a time differential value of the deviation $\Delta T$. The target catalyst temperature is set to such a degree as to desorb SOx from the NOx occlusion reduction type catalyst 32. The estimated catalyst temperature may be estimated, for example, based on an inlet temperature of the oxidation catalyst 31 detected by the first exhaust temperature sensor 43, an exothermic reaction inside the oxidation catalyst 31 and the NOx occlusion reduction type catalyst 32, and the like.

Figure 5:
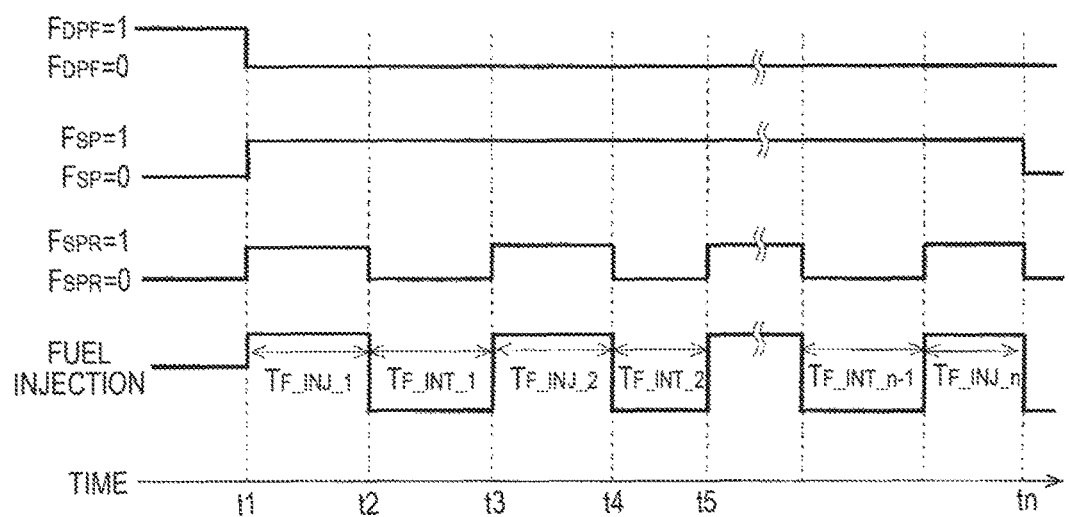
FIG. 5 is a timing chart for describing a catalyst temperature adjustment control in the SOx purge control according to this embodiment.

As illustrated in time $t_1$ of FIG. 5, when the SOx purge flag $F_{SP}$ is turned on by the termination of the filter-forced regeneration ($F_{DPF}=0$), the SOx purge rich flag $F_{SPR}$ is also turned on, and the interval $T_{F\ INT}$ feedback-calculated at the time of the previous SOx purge control is reset temporarily. That is, at first time just after the filter-forced regeneration, the exhaust pipe injection or the post injection is executed in response to the injection time $T_{F\ INJ\ 1}$ set in the injection time setting map (see time from $t_1$ to $t_2$ of FIG. 5). In this manner, the SOx purge control starts front the SOx puree rich control without performing the SOx purge lean control, and thus a prompt transition to the SOx purge control can be performed and the fuel consumption amount can be reduced without lowering the exhaust temperature raised by the filter-forced regeneration.

Next, when the SOx purge rich flag $F_{SPR}$ is turned off with the lapse of the injection time $T_{F\ INJ\ 1}$, the SOx puree rich flag $F_{SPR}$ is turned off until the interval $T_{F\ INT\ 1}$ a set by the PID control elapses (see times $t_2$ to $t_3$ of FIG. 5). In addition, when the SOx purge rich flag $F_{SPR}$ is turned on with the lapse of the interval $T_{F\ INT\ 1}$, the exhaust pipe injection or the post injection according to the injection time $T_{F\ INJ\ 2}$ is executed again (see time from $t_3$ to $t_4$ of FIG. 5). Thereafter, the on-and-off switching of the SOx purge rich flea $F_{SPR}$ is repeatedly executed until the SOx purge flag $F_{SP}$ is turned off (see time $t_n$ of FIG. 5) by the termination determination of the SOx purge control (to be described later).

In this manner, in this embodiment, the injection time $T_{F\ INJ}$ in which the catalyst temperature is raised and the excess-air-ratio is lowered to the second target excess-air-ratio is set from the map based on the operating state of the engine 10, and the interval $T_{F\ INT}$ in which the catalyst temperature is lowered is treated by the PID control. Accordingly, the catalyst temperature in the SOx purge control is effectively kept in the desired temperature range required for a purge, and the excess-air-ratio can be reliably lowered to a target excess ratio.

<Termination Determination of SOx Purge Control>

When any condition of (1) a case where the injection amount of the exhaust pipe injection or the post injection is accumulated since the SOx purge flag $F_{SP}$ is turned on and then the cumulative injection amount reaches a predetermined upper limit: threshold amount, (2) a case where the elapsed time timed front the start of the SOx purge control reaches a predetermined upper limit threshold time, and (3) a case where the SOx adsorbing amount of the NOx occlusion reduction type catalyst 32 calculated based on a predetermined model equation including an operating state of the engine 10, a sensor value of the NOx/lambda sensor 45, or the like as input signals is reduced to a predetermined threshold indicating SOx removal success is satisfied, the SOx purge control is terminated by turning off the SOx purge flag $F_{SP}$ (see time $t_4$ of FIG. 2 and time $t_n$ of FIG. 5).

In this manner, in this embodiment, the upper limit of the cumulative injection amount and the elapsed time is set in the termination condition of the SOx purge control, so that it can he effectively suppressed that the fuel consumption amount is excessive in a case where the SOx purge does not progress due to the lowering of the exhaust temperature and the like.

<NOx Purge Control>

The NOx desorption treatment unit 70 is an example of the regeneration treatment unit of the present invention. The NOx desorption treatment unit 70 executes a control that recovers the NOx occlusion capacity of the NOx occlusion reduction type catalyst 32 by detoxifying the NOx, which is occluded in the NOx occlusion reduction type catalyst 32 when the exhaust gas is under a rich, atmosphere, by reducing and purifying, and then discharging the NOx (hereinafter, referred to the control as an NOx purge control).

Figure 6:
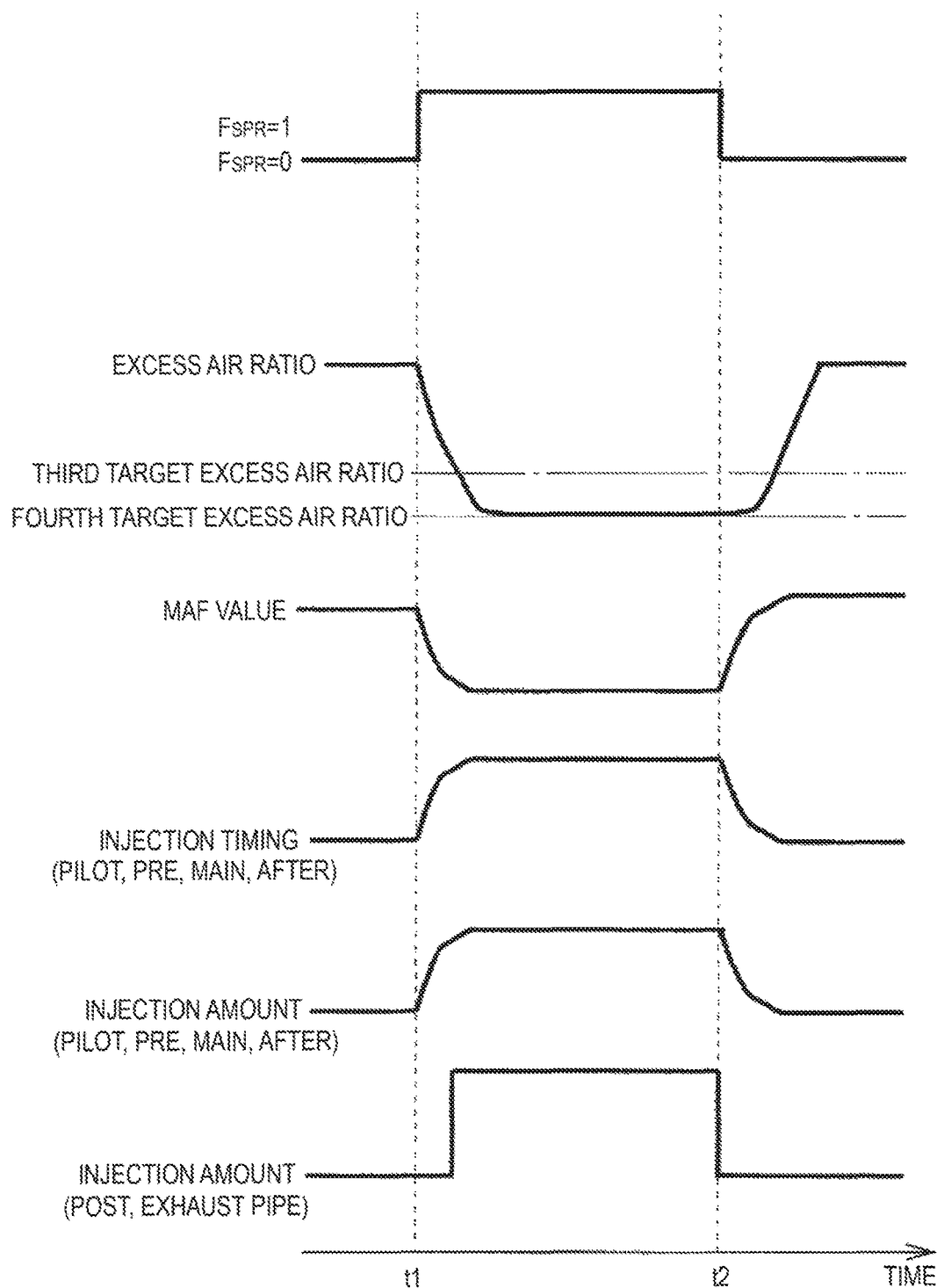
FIG. 6 is a timing chart for describing an NOx purge control according to this embodiment.

The NOx purge flag $F_{NP}$ which starts the NOx purge control is turned on when an NOx discharging amount per unit of time is estimated from the operating state of the engine 10 and then an estimated accumulated value $\Sigma$NOx calculated by accumulating the NOx discharging amounts exceeds the predetermined threshold (see time $t_1$ of FIG. 6). Alternatively, the NOx purge flag $F_{NP}$ is turned on in a case where NOx purification rate of the NOx occlusion reduction type catalyst 32 is calculated from the NOx discharging amount on the catalyst upstream side estimated from the operating state of the engine 10 and then an NOx amount on the catalyst downstream side detected by the NOx lambda sensor 45, and the NOx purification rate is lower than the predetermined determination threshold.

In this embodiment, the enrichment of the exhaust gas is made by using the NOx purge control, for example, in such a manner that the NOx purge lean control that lowers the excess-air-ratio by an air-system control from a steady operating state (for example, about 1.5) to a third target excess-air-ratio (for example, about 1.3) on a lean side from a value equivalent to a theoretical air-fuel ratio (about 1.0), and the NOx purge rich control that lowers the excess-air-ratio by the injection control from a fourth target excess-air-ratio to the second target excess-air-ratio on a rich side (for example, about 0.9) are used in combination. Hereinafter, the detail description will he given about the NOx purge lean control and the NOx purge rich control.

<MAF Target Value Setting of NOx Purge Lean Control>

Figure 7:
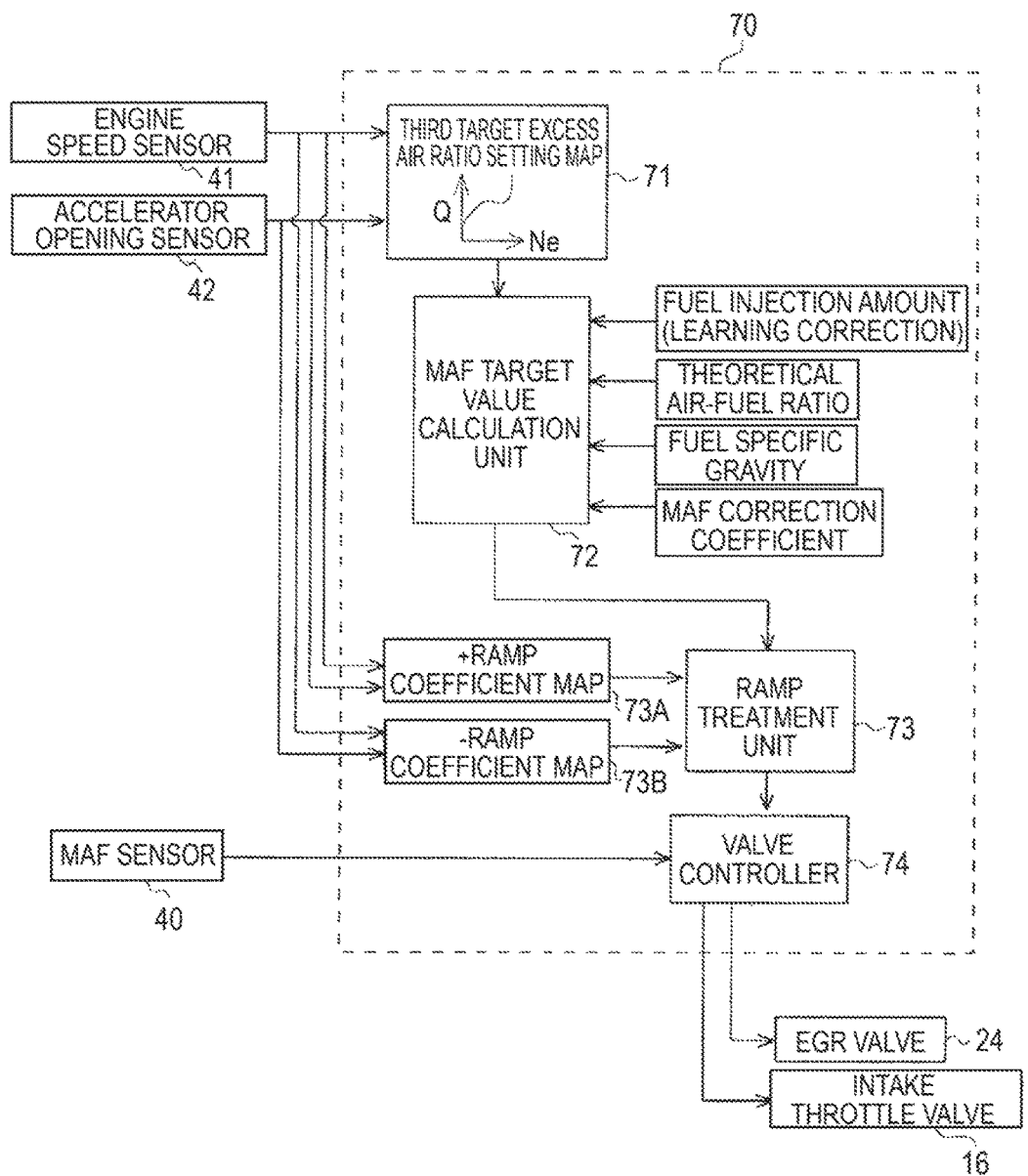
FIG. 7 is a block diagram illustrating a setting process of a MAF target value at the time of an NOx purge lean control according to this embodiment.

FIG. 7 is a block diagram illustrating a setting process of the MAF target value $MAF_{NPL\ Trgt}$ at the time of the NOx purge lean control. A third target excess-air-ratio setting map 71 is a map based on the engine speed Ne and the accelerator opening degree Q. The excess-air-ratio target value $\lambda_{NPL\ Trgt}$ (third target excess-air-ratio) at the time of the NOx purge lean control corresponding to the engine speed Ne and the accelerator opening degree Q is set based on an experiment and the like, in advance.

First, the excess-air-ratio target value $\lambda_{NPL\ Trgt}$ at the time of the NOx purge lean control is read from the third target excess-air-ratio setting map 71 by using the engine speed Ne and the accelerator opening degree Q as input signals, and is input to the MAF target value calculation unit 72. In addition, in the MAF target value calculation unit 72, the MAF target value $MAF_{NPL\ Trgt}$ at time of the NOx purge lean control is calculated based on the following Equation (3).

$$MAF_{NPL\ Trgt} = \lambda_{NPL\ Trgt} \times Q_{fnl\ corrd} \times Ro_{Fuel} \times AFR_{sto}/Maf_{corr} \quad (3)$$

In Equation (3), $Q_{fnl\ corrd}$ indicates a learning-corrected (to be described later) fuel injection amount (excluding the post injection). $Ro_{Fuel}$ indicates a fuel specific gravity, $AFR_{sto}$ indicates a theoretical air-fuel ratio, and $Maf_{corr}$ indicates a MAF correction coefficient (to he described later).

The MAF target value $MAF_{NPL\ Trgt}$ calculated by the MAF target value calculation unit 72 is input to a ramp treatment unit 73 when the NOx purge flag $F_{SP}$ is turned on (see time $t_1$ of FIG. 6). The ramp treatment unit 73 reads a ramp coefficient from ramp coefficient maps 73A and 73B by using the engine speed Ne and the accelerator opening decree Q as input signals, and inputs a MAF target ramp value $MAF_{NPL\ Trgt\ Ramp}$, in which the ramp coefficient is added, to a valve controller 74.

The valve controller 74 executes a feedback control that throttles the intake throttle valve 16 to the shutting side and opens the EGR valve 24 to the open side such that the actual MAF value $MAF_{Act}$ input from the MAF sensor 40 becomes the MAF target ramp value $MAF_{NPL\ Trgt\ Ramp}$.

In this manner, in this embodiment, the MAF target value $MAF_{NPL\ Trgt}$ is set based on the excess-air-ratio target value $\lambda_{NPL\ Trgt}$ read from the third target excess-air-ratio setting map 71 and the fuel injection amount of the injector 11, and an air system operation is feedback-controlled based on the MAF target value $MAF_{NPL\ Trgt}$. Accordingly, without providing the lambda sensor on the upstream side of the NOx occlusion reduction type catalyst 32 or without using a sensor value of the lambda sensor even when the lambda sensor is provided on the upstream side of the NOx occlusion reduction type catalyst 32, the exhaust gas can be effectively lowered to the desired excess-air-ratio required for the NOx purge lean control.

When the fuel injection amount $Q_{fnl\ corrd}$ after the learning correction is used as the fuel injection amount of the injector 11, the MAF target value $MAF_{NPL\ Trgt}$ can be set by a feed-forward control to effectively exclude influence such as the aged deterioration, the property change, or the like of the injector 11.

When the ramp coefficient set in response to the operating state of the engine 10 is added to the MAF target value $MAF_{NPL\ Trgt}$, the deterioration of the drivability and the like caused by the misfire or the torque fluctuation of the engine 10 due to the rapid change of the intake air amount can be effectively suppressed.

<Fuel Injection Amount Setting of NOx Purge Rich Control>

Figure 8:
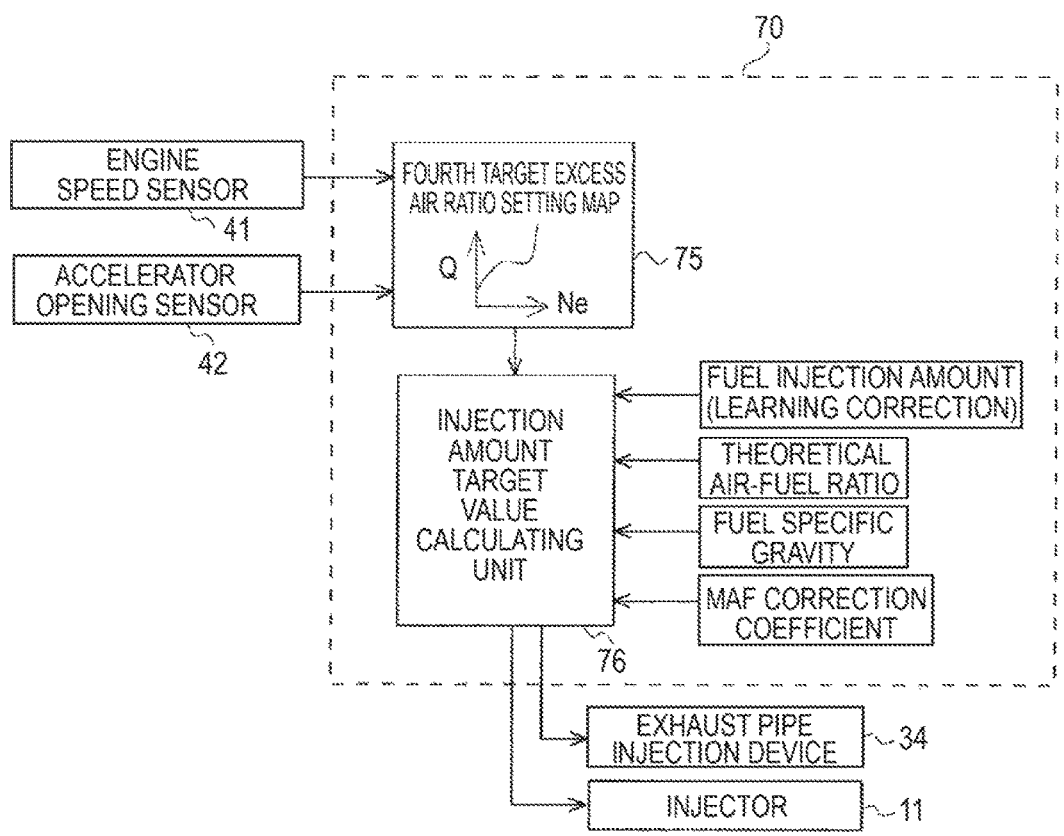
FIG. 8 is a block diagram illustrating a setting process of a target injection amount at the time of an NOx purge rich control according to this embodiment.

FIG. 8 is a block diagram illustrating a setting process of the target injection amount $Q_{NPR\ Trgt}$ (injection amount per unit of time) of the exhaust pipe injection or the post injection in the NOx purge rich control. A fourth target excess-air-ratio setting map 75 is a map based on the engine speed Ne and the accelerator opening degree Q. The excess-air-ratio target value $\lambda_{NPR\ Trgt}$ (fourth target excess-air-ratio) at the time of the NOx purge rich control corresponding to the engine speed Ne and the accelerator opening degree Q is set based on an experiment and the like, in advance.

First, the excess-air-ratio target value $\lambda_{NPR\ Trgt}$ at the time of the NOx purge rich control is read from the fourth target excess-air-ratio setting map 75 by using the engine speed Ne and the accelerator opening degree Q as input signals, and is input to an injection amount target value calculating unit 76. In addition, in the injection amount target value calculating unit 76, the target injection amount $Q_{NPR\ Trgt}$ at the time of the NOx purge rich control is calculated based on the following Equation (4).

$$Q_{NPR\ Trgt} = MAF_{NPL\ Trgt} \times Maf_{corr}/(\lambda_{NPR\ Target} \times Ro_{Fuel} \times AFR_{sto}) - Q_{fnl\ corrd} \quad (4)$$

In Equation (4), $MAF_{NPL\ Trgt}$ is a MAF target value at the time of a lean NOx puree, and is input from the above-described MAF target value calculation unit 72. $Q_{fnlRaw\ corrd}$ indicates a learning-corrected to be described later) fuel injection amount (excluding the post injection) before a MAF follow-up control is applied thereto, $Ro_{Fuel}$ indicates a fuel specific gravity, and $AFR_{sto}$ indicates a theoretical air-fuel ratio, and $Maf_{corr}$ indicates a MAF correction coefficient (to be described later).

When the NOx purge flag $F_{SP}$ is turned on, the target injection amount $Q_{NPR\ Trgt}$ calculated by the injection amount target value calculating unit 76 is transmitted as the, injection instruction signal to the exhaust pipe injection device 34 or the injector 11 (time $t_1$ of FIG. 6). The transmission of the injection instruction signal is continued until the NOx purge flag $F_{NP}$ is turned off (time $t_2$ of FIG. 6) by the termination determination of the NOx puree control (to be described later).

In this manner, in this embodiment, the target injection amount $Q_{NPR\ Trgt}$ is set based on the excess-air-ratio target value $\lambda_{NPR\ Trgt}$ read from the fourth target excess-air-ratio setting map 75 and the fuel injection amount of the injector 11. Accordingly, without providing the lambda sensor on the upstream side of the NOx occlusion reduction type catalyst 32 or without using a sensor value of the lambda sensor even when the lambda sensor is provided on the upstream side of the NOx occlusion reduction type catalyst 32, the exhaust gas can be effectively lowered to the desired excess-air-ratio required for the NOx purge rich control.

When the fuel injection amount $Q_{fnl\ corrd}$ after the learning correction is used as the fuel injection amount of the injector 11, the target injection amount $Q_{NPR\ Trgt}$ can be set by the feed-forward control to effectively exclude influence such as the aged deterioration, the property change, or the like of the injector 11.

<Air-System Control Prohibition of NOx Purge Control>

In an area where the operating state of the engine 10 is in a low load, the ECU 50 feedback-controls the opening degree of the intake throttle valve 16 or the EGR valve 24 based on a sensor value of the MAF sensor 40. On the other hand, in an area where the operating state of the engine 10 is in a high load, the ECU 50 feedback-controls a supercharging pressure by the variable capacity supercharger 20 based on a sensor value of the boost pressure sensor 46 (hereinafter, referred to the area as a boosting pressure FB control area).

In such a boosting pressure FB control area, a phenomenon occurs in which the control of the intake throttle valve 16 or the EGR valve 24 interferes with the control of the variable capacity supercharger 20. For this, reason, there is a problem that the intake air amount cannot be kept to the MAF target value $MAF_{NPL\ Trgt}$ even when the NOx purge lean control is executed in which air system is feedback-controlled based on the MAF target value $MAF_{NFL\ Trgt}$ set in the above-described Equation (3). As a result, even when the NOx purge rich control to execute the post injection or the exhaust pipe injection starts, the excess-air-ratio may not be lowered to the fourth target excess-air-ratio (excess-air-ratio target valuer $\lambda_{NPR\ Trgt}$) required for the NOx purge.

In order to avoid such a phenomenon, in the boosting pressure FB control area, the NOx desorption treatment unit 70 of this embodiment prohibits the NOx purge lean control to adjust the opening degree of the intake throttle valve 16 or the EGR valve 24, and lowers the excess-air-ratio to the fourth target excess-air-ratio (excess-air-ratio target value $\lambda_{NPR\ Trgt}$) only through the exhaust pipe injection or the post injection. Accordingly, even in the boosting pressure FB control area, the NOx purge can be performed reliably. In addition, in the case, the MAF target value set based on the operating state of the engine 10 may be applied to the MAT target value $MAF_{NPL\ Trgt}$ of the above-described Equation (4).

<Termination Determination of NOx Purge Control>

When any condition of (1) a case where the injection amount of the exhaust pipe injection or the post injection is accumulated since the NOx purge flag $F_{NP}$) is turned on and then the cumulative injection amount reaches a predetermined upper limit threshold amount, (2) a case where the elapsed time timed from the start of the NOx purge control reaches the predetermined upper limit threshold time, and (3) a case where the NOx occlusion amount of the NOx occlusion reduction type catalyst 32 calculated based on a predetermined model equation including an operating state of the engine 10, a sensor value of the NOx/lambda sensor 45, or the like as input signals is reduced to a predetermined threshold indicating NOx removal success is satisfied, the NOx purge control is terminated by turning off the NOx purge flag $F_{NP}$ (see time $t_2$ of FIG. 6).

In this manner, in this embodiment, the upper limit of the cumulative injection amount and the elapsed time is set in the termination condition of the purge control so that it can be reliably suppressed that the fuel consumption amount is excessive in a case where the NOx purge does not succeed due to the lowering of the exhaust temperature and the like.

<MAF Follow-Up Control >

In (1) a period of switching from the lean state of a regular operation to the rich state through the SOx purge control or the NOx purge control, and (2) a period of switching the rich state to the lean state of the regular operation through the SOx puree control or the NOx purge control, the MAF follow-up controller 80 executes a control to correct the fuel injection timing and the fuel injection amount of the injector 11 in response to a MAF change (hereinafter, referred to the control as a MAF follow-up control).

<Injection Amount Learning Correction>

Figure 9:
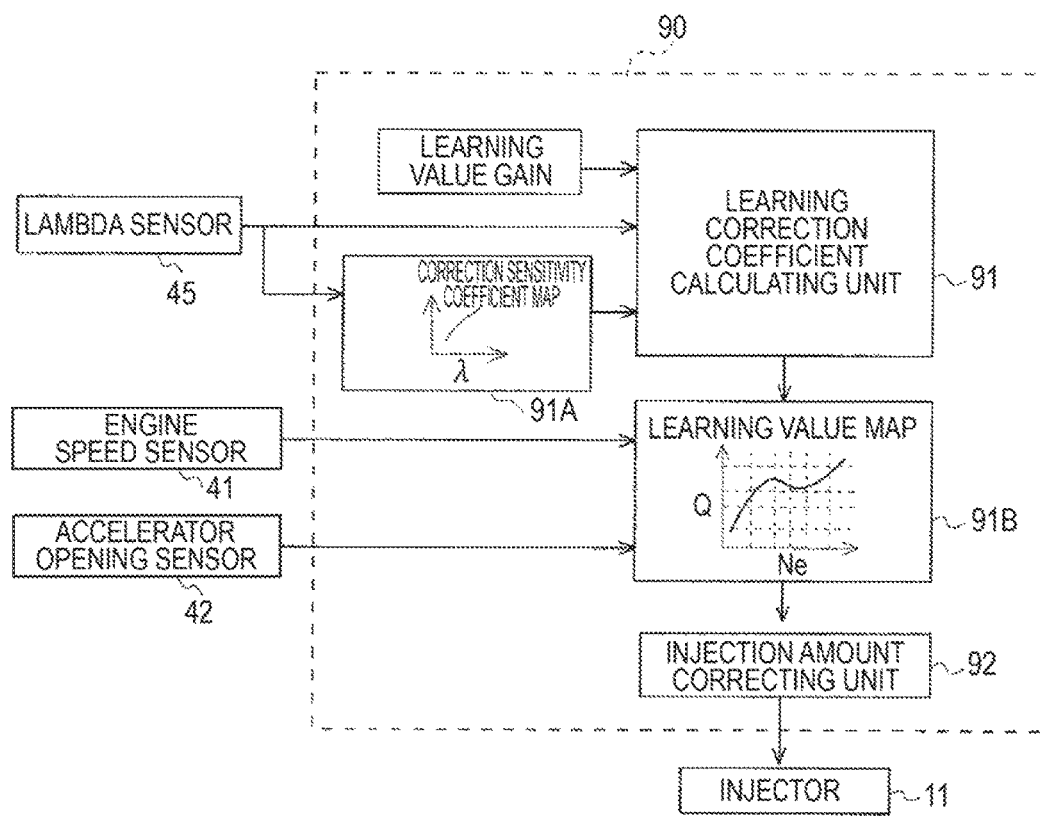
FIG. 9 is a block diagram illustrating a process of an injection amount learning correction of an injector according to this embodiment.

As illustrated in FIG. 9, the injection amount learning correction unit 90 includes a learning correction coefficient calculating unit 91 and an injection amount correcting unit 92.

Figure 10:
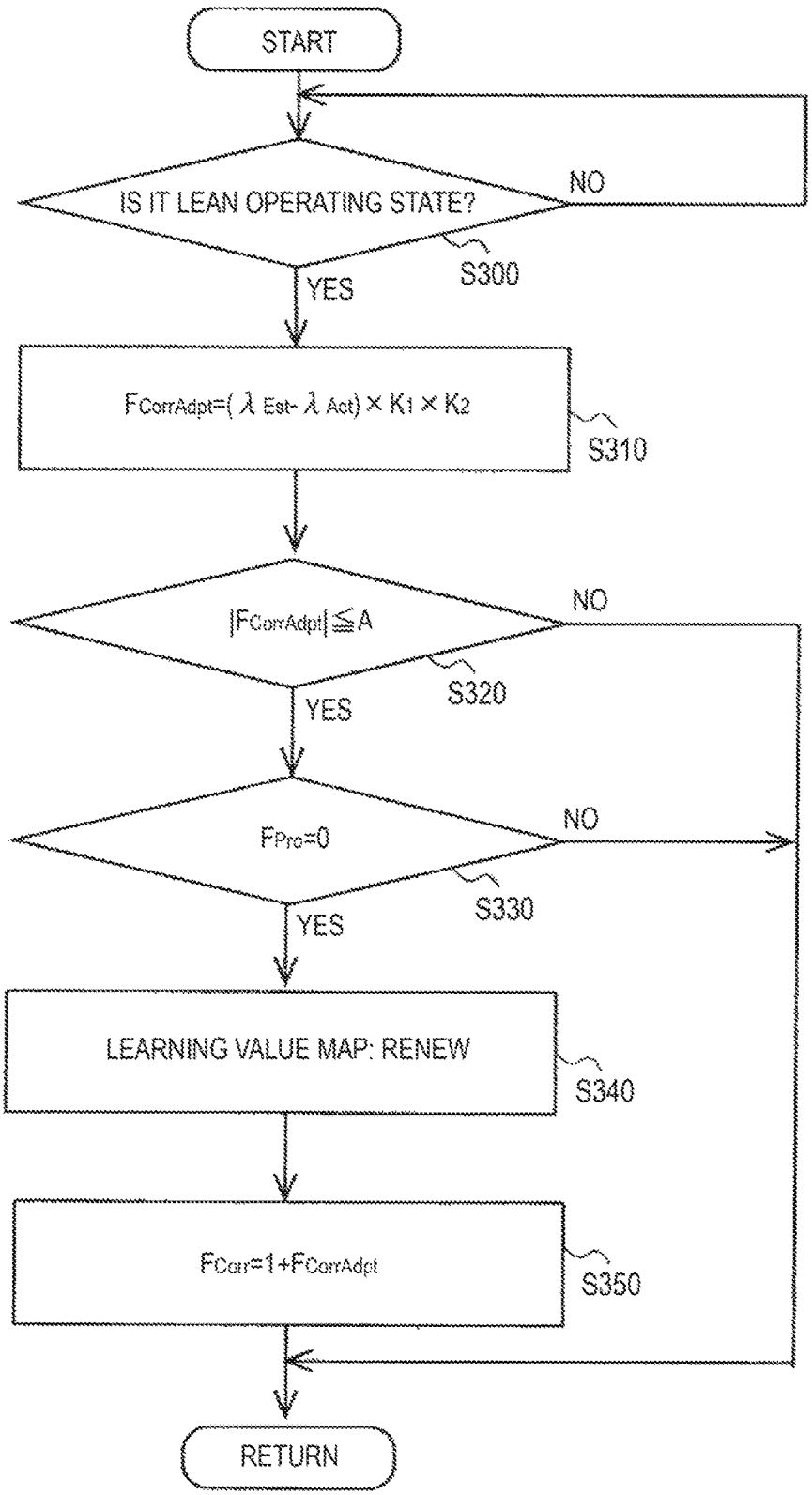
FIG. 10 is a flow diagram, for describing a calculation process of a learning correction coefficient according to this embodiment.

The learning correction coefficient calculating unit 91 calculates a learning correction coefficient $F_{Corr}$ of the fuel injection amount based on an error $\Delta\lambda$ between an actual lambda value $\lambda_{Act}$ detected by the NOx/lambda sensor 45 at the time of a lean operation of the engine 10 and an estimated lambda value $\lambda_{Est}$. When the exhaust gas is in the lean state, the oxidation reaction of NC does not occur in the oxidation catalyst 31, and thus it is considered that the actual lambda value $\lambda_{Act}$ in the exhaust gas which passes through the oxidation catalyst 31 and is detected by the NOx/lambda sensor 45 on the downstream side matches with the estimated lambda value $\lambda_{Est}$ in the exhaust gas discharged from the engine 10. For this reason, in a case where the error $\Delta\lambda$ occurs between the actual lambda value $\lambda_{Act}$ and the estimated lambda value $\lambda_{Est}$, the error can be assumed to result from a difference between an instructed injection amount and an actual injection amount in the injector 11. Hereinafter, the calculation process of the learning correction coefficient performed by the learning correction coefficient calculating unit 91 using the error $\Delta\lambda$ will be described based on the flow of FIG. 10.

In Step S300, it is determined based on the engine speed Ne and the accelerator opening degree Q whether the engine 10 is in a lean operating state. If the engine 10 is in the lean, operating state, the procedure proceeds to Step S310 in order to start the calculation of the learning correction coefficient.

In Step S310, a learning value $F_{Corr\ Adpt}$ is calculated by multiplying the error $\Delta\lambda$, which is obtained by subtracting the actual lambda value $\Delta_{Est}$, detected by the NOx/lambda sensor 45 from the estimated lambda value by a learning value gain $K_1$ and a correction sensitivity coefficient $K_2$ ($F_{CorrAdpt}=(\lambda_{Est}-\lambda_{Act})\times K_1\times K_2$). The estimated lambda value $\lambda_{Est}$ is estimated and calculated front the operating state of the engine 10 based on the engine speed. Ne or the accelerator opening degree Q. The correction sensitivity coefficient $K_2$ is read from a correction sensitivity coefficient map 91A illustrated in FIG. 9 by using the actual lambda value $\lambda_{Act}$ detected by the NOx/lambda sensor 45 as an input signal.

In Step S320, it is determined whether an absolute value $|F_{CorrAdpt}|$ of the learning value $F_{CorrAdpt}$ is in a range of a predetermined correction limit value A. In a case where the absolute value $|F_{CorrAdpt}|$ exceeds the correction limit value A, this control returns to stop the present learning.

In Step S330, it is determined whether a learning prohibition flag $F_{Pro}$ is turned off. The learning prohibition flag $F_{Pro}$ corresponds, for example, to the time of a transient operation of the engine 10, the time of the SOx purge control ($F_{SP}=1$), the time of the NOx purge control ($P_{NP}=1$), and the like. It is because in a state where such a condition is satisfied, the error $\Delta\lambda$ becomes larger according to the change of the actual lambda value $\lambda_{Act}$ so that the learning is not executed exactly. As for whether the engine 10 is in a transient operating state, for example, based on the time change amount of the actual lambda value $\lambda_{Act}$ detected by the NOx/lambda sensor 45, a case where the time change amount is larger than the predetermined threshold may be determined as the transient operating state.

In Step S340, a learning value map 91B (see FIG. 9) based on the engine speed Ne and the accelerator opening degree Q is renewed to the learning value $F_{CorrAdpt}$ calculated in Step S310. More specifically, a plurality of learning areas sectioned in response to the engine speed Ne and the accelerator opening degree Q are set on the learning value map 91B. Preferably, such learning areas are set such that the range thereof is narrower as the area is used more frequently, and the range thereof is wider as the area is used less frequently. Accordingly, in the frequently used area, a learning accuracy can be improved, and in the less-frequently used area, non-learning can be effectively suppressed.

In Step S350, the learning correction coefficient $F_{Corr}$ is calculated by adding "1" to the learning value read from the learning value map 91B by using the engine speed Ne and the accelerator opening degree Q as input signals ($F_{Corr}$=1+ $F_{CorrAdpt}$). The learning correction coefficient $F_{Corr}$ is input to the injection amount correcting unit 92 illustrated in FIG. 9.

The injection amount correcting unit 92 executes the correction of the fuel injection amount by multiplying respective basic injection amounts of a pilot injection $Q_{Pilot}$, a pre-injection $Q_{Pre}$, a main injection $Q_{main}$, an after injection $Q_{After}$, and a post injection $Q_{Post}$ by the learning correction coefficient $F_{Corr}$.

In this manner, a variation such as the aged deterioration, the property change, or the individual difference of the injectors 11 can be effectively excluded by correcting the fuel injection amount of the injector 11 with the learning value according to the error $\Delta\lambda$ between the estimated lambda value $\lambda_{Est}$ and the actual lambda value $\lambda_{Act}$.

<MAF Correction Coefficient>

The MAF correction coefficient calculation unit 95 calculates a MAF correction coefficient $Maf_{corr}$ used to set the MAF target value $MAF_{SPL\ Trgt}$ or the target injection amount $Q_{SPR\ Trgt}$ at the time of the SOx purge control and to set the MAF target value $MAF_{NPL\ Trgt}$ or the target injection amount $Q_{NPR\ Trgt}$ at the time of the NOx purge control.

In this embodiment, the fuel injection amount of the injector 11 is corrected based on the error $\Delta\lambda$ between the actual lambda value $\lambda_{Act}$ detected, by the NOx/lambda sensor 45 and the estimated lambda value $\lambda_{Est}$. However, since the lambda is a ratio of air and fuel, a factor of the error $\Delta\lambda$ is not necessarily limited to the effect of the difference between the instructed injection amount and the actual injection amount in the injector 11. That is, the error $\Delta\lambda$ of the lambda may be affected by an error of the MAF sensor 40 as well as that of the injector 11.

Figure 11:
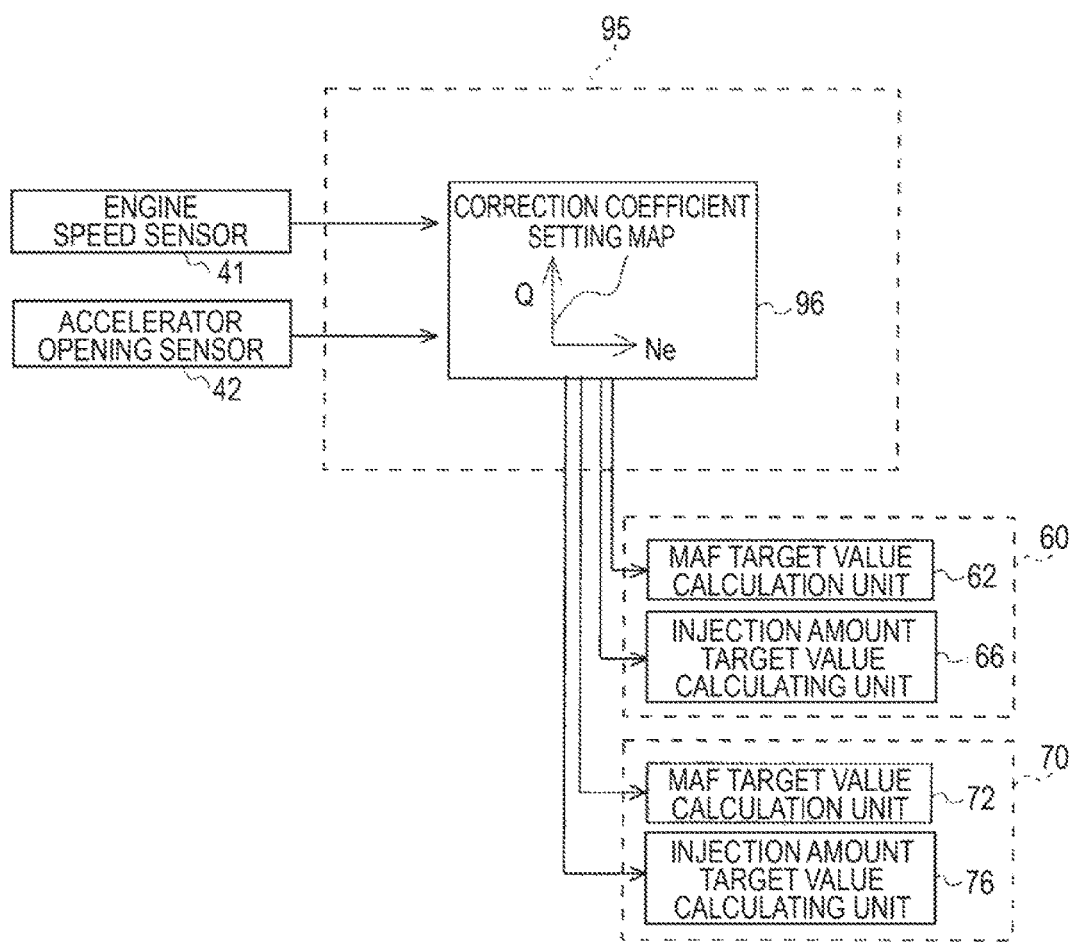
FIG. 11 is a block diagram illustrating a setting process of a MAF correction coefficient according to this embodiment.

FIG. 11 is a block diagram illustrating a setting process of the MAF correction coefficient $Maf_{corr}$ performed by, the MAF correction coefficient calculation unit 95. A correction coefficient setting map 96 is a map based on the engine speed Ne and the accelerator opening degree Q, arid the MAF correction coefficient $Maf_{corr}$ indicating the sensor property of the MAF sensor 40 corresponding to the engine speed Ne and the accelerator opening degree Q is set based on an experiment and the like, in advance.

The MAF correction coefficient calculation unit 95 reads the MAF correction coefficient $Maf_{corr}$ from the correction coefficient setting map 96 by using the engine speed Ne and the accelerator opening degree Q as input signals, and transmits the MAF correction coefficient $Maf_{corr}$ to the MAF target value calculation units 62 and 72 and the injection amount target value calculating units 66 and 76. Accordingly, the sensor property of the MAF sensor 40 can be effectively reflected to set the MAF target value $MAF_{SPL\ Trgt}$ or the target injection amount $Q_{SPR\ Trgt}$ at the time of the SOx purge control and the MAF target value $MAF_{NPL\ Trgt}$ or the target injection amount $Q_{NPR\ Trgt}$ at the time of the NOx purge control.

<Others>

The present invention not limited to the above-described embodiment, and the invention may be modified appropriately without departing from the spirit and scope of the invention.

The invention claimed is:

1. An exhaust purification system comprising:
   an NOx reduction catalyst, which is provided in an exhaust system of an internal combustion engine and reduces and purifies NOx in an exhaust gas; and
   a regeneration treatment controller, which recovers an NOx purification capacity of the NOx reduction catalyst by lowering an excess-air-ratio of the exhaust gas to a predetermined target excess-air-ratio,
   wherein the regeneration treatment controller:
   sets a target injection amount of at least one of a post injection and an exhaust pipe injection that is required for setting an excess-air-ratio of the exhaust gas to the target excess-air-ratio, based on a suction air amount of the internal combustion engine, the target excess-air-ratio, and a fuel injection amount of the internal combustion engine; and
   controls an injection amount of at least one of the post injection and the exhaust pipe injection, based on the target injection amount,
   wherein the regeneration treatment controller sets a value, which is obtained by subtracting the fuel injection amount of the internal combustion engine from a value obtained by dividing the suction air amount of the internal combustion engine by a product of the target excess-air-ratio a fuel specific gravity, and a theoretical air-fuel ratio, as the target injection amount.

2. The exhaust purification system according to claim 1, further comprising:
   a lambda sensor provided in the exhaust system of the internal combustion engine;
   wherein a regeneration treatment controller corrects the fuel injection amount of the internal combustion engine, based on a difference between an estimated lambda value estimated from an operating state of the internal combustion engine and an actual lambda value detected by the lambda sensor,
   wherein the regeneration treatment controller uses the corrected fuel injection amount as the fuel injection amount of the internal combustion engine.

3. The exhaust purification system according to claim 1, wherein the target excess-air-ratio is set based on an operating state of the internal combustion engine.

4. A control method of an exhaust purification system which includes an NOx reduction catalyst which is provided in an exhaust system of an internal combustion engine, and reduces and purifies NOx in an exhaust gas, and a regeneration treatment controller which recovers an NOx purification capacity of the NOx reduction catalyst by lowering an excess-air-ratio of the exhaust gas to a predetermined target excess-air-ratio, the method comprising:
setting a target injection amount of at least one of a post injection and an exhaust pipe injection that is required for setting an excess-air-ratio of the exhaust gas to the target excess-air-ratio, based on a suction air amount of the internal combustion engine, the target excess-air-ratio, and a fuel injection amount of the internal combustion engine;
controlling an injection amount of at least one of the post injection and the exhaust pipe injection, based on the target injection amount; and
setting a value, which is obtained by subtracting the fuel infection amount of the internal combustion engine from a value obtained by dividing the suction air amount of the internal combustion engine by a product of the target excess-air-ratio, a fuel specific gravity, and a theoretical air-fuel ratio, as the target injection amount.

5. The control method according to claim 4, further comprising:
correcting the fuel injection amount of the internal combustion engine, based on a difference between a sensor value of a lambda sensor provided in the exhaust system of the internal combustion engine and an estimated lambda value estimated from an operating state of the internal combustion engine; and
setting the target injection amount by using the corrected fuel injection amount.

\* \* \* \* \*